United States Patent [19]

Akuzawa et al.

[11] Patent Number: 5,453,850
[45] Date of Patent: Sep. 26, 1995

[54] IMAGE READING APPARATUS AND METHOD USING LIGHT SHUTTER FOR BLOCKING LIGHT FROM A LIGHT SOURCE

[75] Inventors: Yoshihide Akuzawa; Yasutoshi Serizawa; Hiromasa Urata, all of Shizuoka, Japan

[73] Assignee: Tokyo Electric Co., Ltd., Tokyo, Japan

[21] Appl. No.: 370,213

[22] Filed: Jan. 6, 1995

Related U.S. Application Data

[63] Continuation of Ser. No. 59,919, May 11, 1993, abandoned.

[30] Foreign Application Priority Data

May 13, 1992 [JP] Japan ................................ 4-120475

[51] Int. Cl.⁶ ............................................. H04N 1/04
[52] U.S. Cl. ........................ 358/475; 358/462; 358/464
[58] Field of Search ...................... 358/471, 474, 358/475, 497, 461, 462, 464; 348/251; 355/228, 229; H04N 1/04

[56] References Cited

U.S. PATENT DOCUMENTS

| | | | |
|---|---|---|---|
| 3,952,144 | 4/1976 | Kolker. | |
| 4,723,174 | 2/1988 | Nishikawa et al. | 358/464 |
| 5,079,638 | 1/1992 | Kishi et al. | 358/462 |
| 5,084,772 | 1/1992 | Shimoyama | 358/461 |
| 5,105,286 | 4/1992 | Sakurai | 358/464 |
| 5,202,773 | 4/1993 | Kato | 358/461 |
| 5,282,053 | 1/1994 | Robideau | 358/461 |
| 5,296,944 | 3/1994 | Suzuki et al. | 358/475 |

FOREIGN PATENT DOCUMENTS

| | | |
|---|---|---|
| 3-96171 | 4/1991 | Japan. |
| 4-63058 | 2/1992 | Japan. |
| 4-72862 | 3/1992 | Japan. |

*Primary Examiner*—Edward L. Coles, Sr.
*Assistant Examiner*—Kim Yen Vu
*Attorney, Agent, or Firm*—Frishauf, Holtz, Goodman, Langer & Chick

[57] ABSTRACT

An image reading apparatus includes a light source for illuminating a document, and a line image CCD for performing photoelectric conversion on the light reflected from the document. Particularly, the image reading apparatus further includes a light shutting device for selectively shutting off the light directed toward the line image CCD, and a processing section for obtaining, as reference black data, the output data of the line image CCD produced in a state where the light directed toward the line image CCD is shut off, for obtaining, as image data of the document, the output data of the line image CCD produced in a state where the light directed toward the line image CCD is not shut off, and for performing shading correction on the image data according to the reference black data.

10 Claims, 6 Drawing Sheets

IMAGE READING APPARATUS AND METHOD USING LIGHT SHUTTER FOR BLOCKING LIGHT FROM A LIGHT SOURCE

This application is a Continuation of application Ser. No. 08/059,919, filed May 11, 1993, abandoned.

BACKGROUND OF THE INVENTION

1. Field of the Invention

This invention relates to an image reading apparatus and method for reading an image on a document in a copier, a facsimile, an image scanner, or the like.

2. Description of the Related Art

To read an image from a document on a document table, an image scanner is provided with, for example, an image reading apparatus, which contains a light source that illuminates a document through a reading window of a document table, a line image CCD that performs photoelectric conversion on light reflected from the document, and a carriage that supports the light source and the line image CCD beneath the document table. The line image CCD is made up of a line of photocells. The light source is composed of a straight fluorescent lamp. The straight fluorescent lamp and the line of photocells are placed in parallel to a line extending in a main scanning direction in the widthwise direction of the reading window. The carriage is provided so as to be movable in a sub-scanning direction in the lengthwise direction of the reading window.

In an image reading operation, the image reading apparatus first turns on the light source and then causes the carriage to move forward so as to traverse the reading window. As the movement of the carriage changes the coordinates of a document that reflects the light from the light source toward the line image CCD, the line image CCD senses an image of the document in units of one line by repeating the photoelectric conversion corresponding to the change of the coordinates.

The amount of light emitted from the straight fluorescent lamp tends to be smaller near both its ends than near its center. When the amount of light emitted from the light source is not uniform in the main scanning direction, the photocells of the line image CCD produce output data reflecting the non uniformity of the amount of light emitted. Therefore, the output data of the photocells are normally subjected to shading correction to enable exact image reading. Conventionally, two techniques explained below are generally used for shading correction. The first technique is such that a reference white plate is placed on the back of the document table so as to correspond to the home position of the carriage set outside the reading window, and some of the photocells near one end of the line image CCD are masked. The image reading apparatus obtains the output data of the masked photocells and the output data of the unmasked photocells as reference black data and reference white data, respectively, when the reference white plate is illuminated by the fluorescent lamp. It then determines correction coefficients for the unmasked photocells on the basis of the reference black data and the reference white data. After this, it performs shading correction by multiplying the output data of the unmasked photocells by the correction coefficients, when the document is illuminated as the carriage is moved. The second technique is such that none of the photocells of the line image CCD are masked and the aforementioned reference white plate is provided. The image reading apparatus obtains the output data of the photocells as reference black data when the fluorescent lamp is off, and the output data of the photocells as reference white data when the lamp is on. It then determines correction coefficients for the photocells on the basis of the reference black data and the reference white data. After this, it performs shading correction by multiplying the output data of photocells by the correction coefficients, when the document is illuminated as the carriage is moved.

The first technique, however, has the disadvantage of being unable to guarantee the reliability of the correction coefficients because the correction coefficients for the unmasked photocells are determined on the basis of the reference black data obtained from the masked photocells that are not related to actual image reading. The second technique has the disadvantage of delaying the start of image reading after the document on the reading window is replaced. Although a light source such as a fluorescent lamp requires a long rising time from when the lamp is turned on until the amount of light emitted becomes stable, the light source must be turned off once to determine the correction coefficients for the photocells before image reading. This delays the start of image reading for as long as the rising time after the light source is turned on again. Further, with the second technique, the reliability of the correction coefficients is decreased by external light that hits the light image CCD while the light source is off. In addition, the service life of the light source is shorten by the frequent switching of the light source.

SUMMARY OF THE INVENTION

The object of the present invention is to provide an image reading apparatus and method capable of improving the accuracy of shading correction without decreasing the image reading speed.

The foregoing object is accomplished by providing an image reading apparatus comprising: a light source for illuminating a document; an image sensor for performing photoelectric conversion on the light reflected from the document; a shutter mechanism for selectively shutting off the light directed toward the image sensor; and a processing section for obtaining, as reference black data, the output data of the image sensor produced in a state where the light directed toward the image sensor is shut off, for obtaining, as image data of the document, the output data of the image sensor produced in a state where the light directed toward the image sensor is not shut off, and for performing shading correction on the image data according to the reference black data.

The foregoing object is also accomplished by providing an image reading method comprising the steps of: shutting off the light directed toward an image sensor for performing photoelectric conversion by enabling a shutter mechanism to obtain the output data of the image sensor as reference black data; exposing the image sensor to the light reflected from a reference white plate and a document by disabling the shutter mechanism to obtain the output data of the image sensor as reference white data and image data of the document, respectively; and performing shading correction on the image data according to the reference black data and the reference white data.

With the image reading apparatus and method, the reference black data are obtained when the shading mechanism has shut off the light directed toward the image sensor. At this time, the light source does not have to be turned off. This allows image reading to be started immediately after the replacement of the document, regardless of the rising characteristic of the light source. In addition, because shading correction is made according to the reference black data obtained from the image sensor used in actual image reading, its reliability is very high.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An image reading apparatus according to an embodiment of the present invention will be explained, referring to FIGS. 1A through 4B. The image reading apparatus is used in, for example, an image scanner for entering image information in a computer system.

Figure 1A:
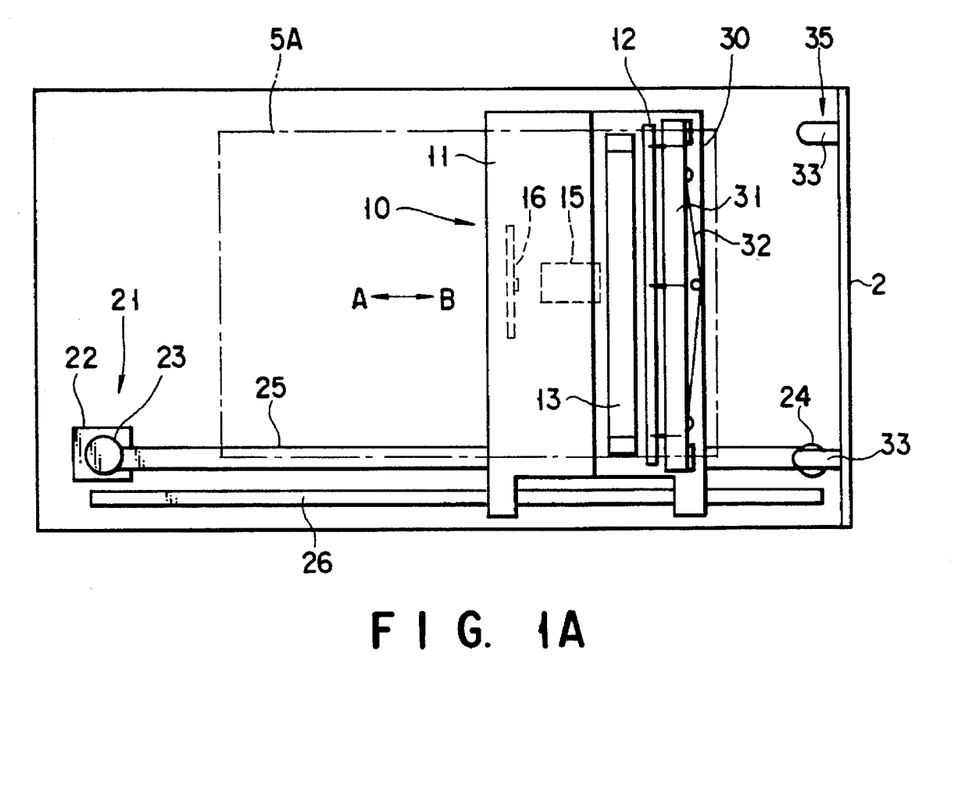
FIG. 1A is a plan view of an image reading apparatus according to an embodiment of the present invention.
Figure 1B:
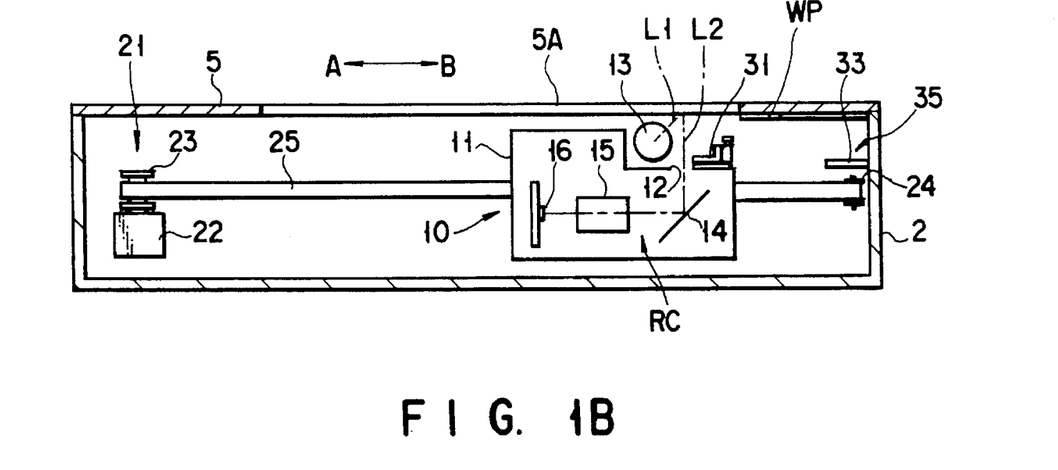
FIG. 1B is a sectional view of the image reading apparatus of FIG. 1A.
Figure 2A:
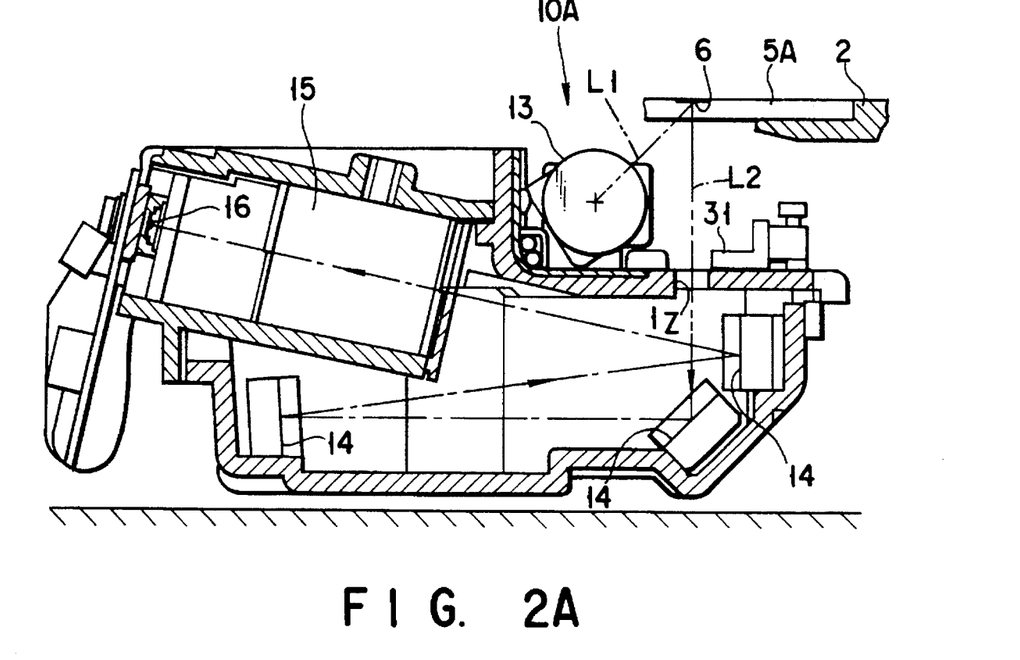
FIG. 2A is a detailed sectional view showing the construction of the optical system of FIG. 1B.
Figure 2B:
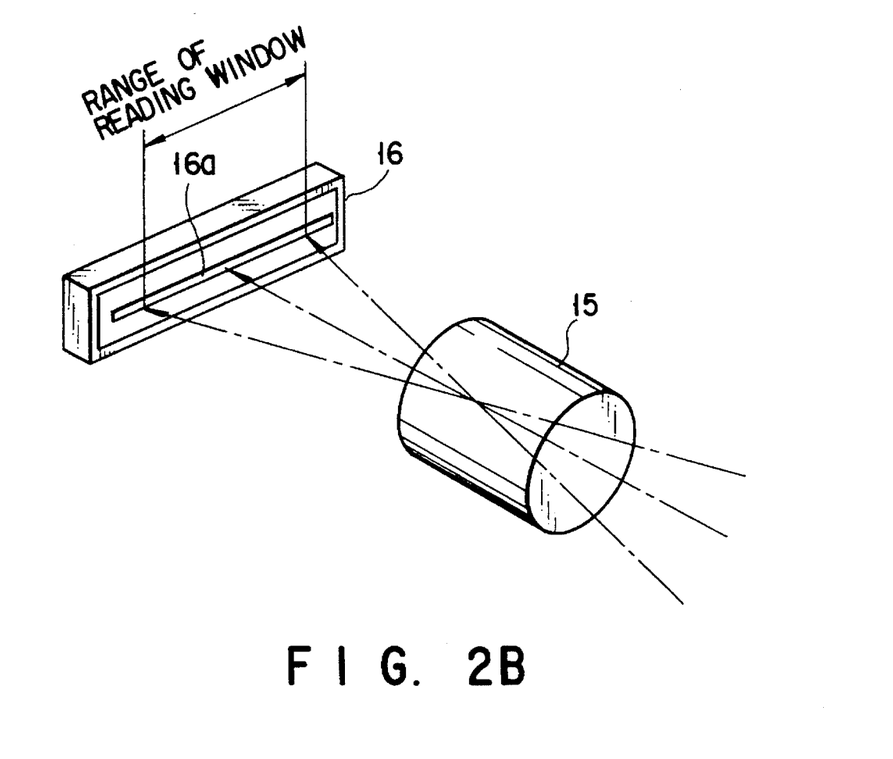
FIG. 2B shows rays of light directed toward the line image CCD passing through a lens in the optical system of FIG. 2A.

FIGS. 1A and 1B are a plan view and a sectional view of the image reading apparatus, respectively. The image reading apparatus is provided with a body unit 2, a document table 5 provided on the top face of the body unit 2, a carriage 11 provided beneath the document table, and a driving mechanism 21 for driving the carriage 11. The document table 5 has a reading window 5A of transparent glass that limits the reading range of a document. The carriage 11 supports an optical system 10 for reading an image. The driving mechanism 21 moves the carriage 11 in a sub-scanning direction in the lengthwise direction of the reading window 5A (shown by arrows A–B in FIGS. 1A and 1B). A document is put on the document table 5, and then is covered with a document cover (not shown). The optical system 10 comprises of a light source 13 for illuminating the document on the document table 5 through the reading window 5A, and a light-receiving section RC for receiving the reflected light from the document. The carriage 11, which is formed as a case housing all of the light-receiving section of the optical system 10, has a slit 12 extending in a main scanning direction in the widthwise direction of the document reading window 5A. The light-receiving section RC, as shown in detail in FIG. 2A, contains a plurality of mirrors 14 (simplified in FIG. 1B) that reflect the incident light passing through the slit 12, a lens 15 that receives the light directed by the mirrors 14, and a line image CCD 16 that receives the light condensed by the lens 15 as shown in FIG. 2B and photoelectrically converts it. The light source 13 is made up of a straight fluorescent lamp. The line image CCD comprises a line of photocells 16a. The line of photocells 16a and the straight fluorescent lamp are placed in parallel to a line extending in the main scanning direction. The driving mechanism 21 contains a motor 22, pulleys 23 and 24, a belt 25, and a guide shaft 26. The guide shaft 26 is provided so as to extend in the sub-scanning direction. The belt 25 is stretched between the pulleys 23 and 24 so as to be parallel to the guide shaft 26. The motor 22 is mounted on the body unit 2 near one end of the guide shaft 26. The pulley 23 is connected to the shaft of the motor 22, whereas the pulley 24 is mounted on the body unit 2. The belt 25, which is driven by the motor 22 via the pulley 23, transports the carriage 11. The carriage 11 moves forward as shown by arrow A (FIGS. 1A and 1B) along the guide shaft 26 when the motor 22 rotates counterclockwise, and moves backward as shown by arrow B (FIGS. 1A and 1B) along the guide shaft 26 when the motor 22 rotates clockwise.

Figure 3A:
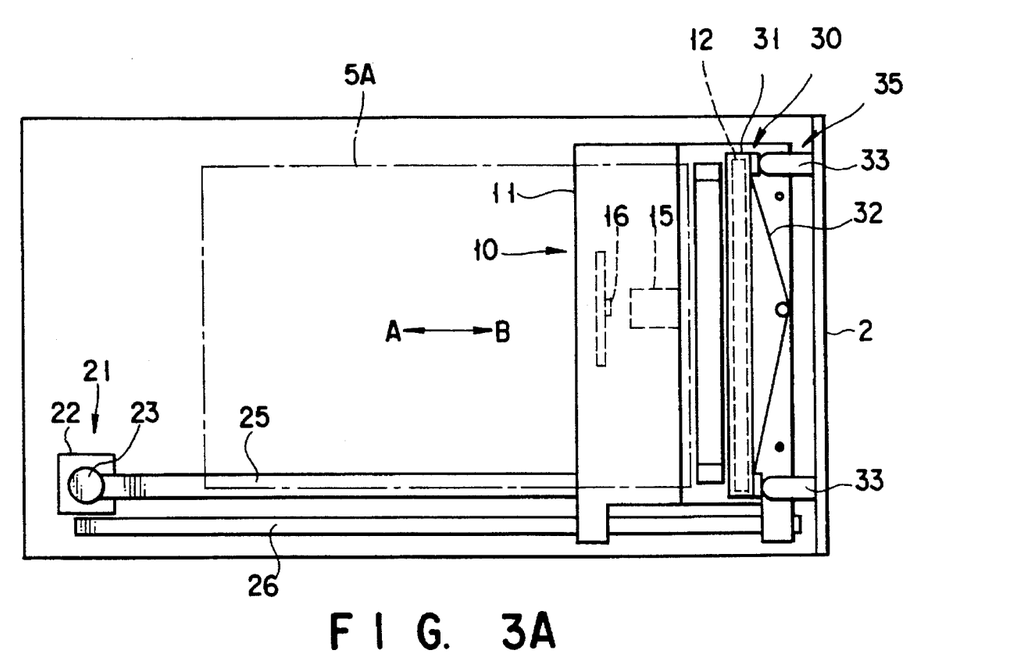
FIGS. 3A and 3B are plan and sectional views showing the carriage of FIGS. 1A and 1B resting in the home position.
Figure 3B:
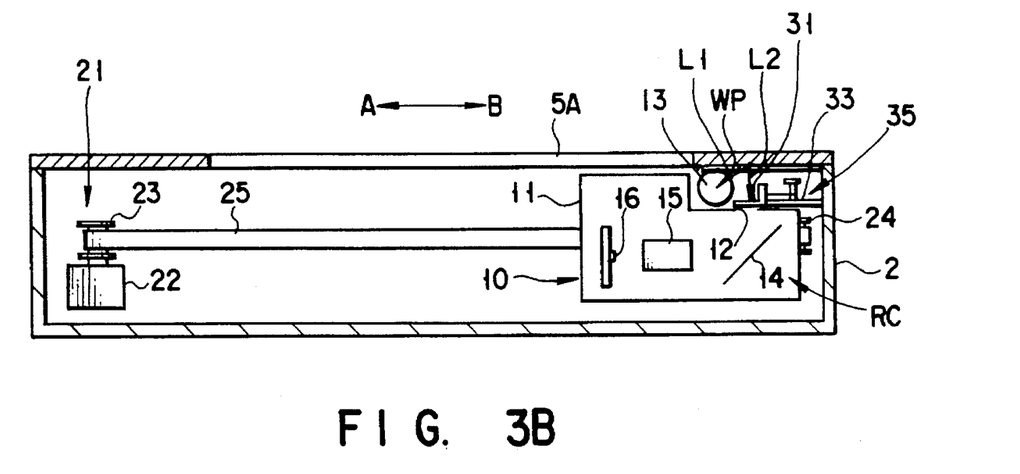

The image reading apparatus has a reference white plate WP that extends in the main scanning direction and provided on the back of the document table 5 so as to be adjacent to one end of the reading window 5A. The light source 13 illuminates the reference white plate WP before the reading of a document image. The line image CCD 16 performs photoelectric conversion of the reflected light from the reference white plate WP to obtain reference white data for shading correction. The image reading apparatus further contains a light shutting device for selectively shutting off the light passing through optical paths L1 and L2 and entering the slit 12. The light shutting device includes a shutter mechanism 30 provided on the carriage 11, and an actuator 35 for actuating the shutter mechanism 30. The shutter mechanism 30 comprises a shutter 31 that can slide in the sub-scanning direction to open and close the slit 12, and an urging spring 32 (FIGS. 1A and 1B) that urges the shutter 31 toward the side indicated by arrow B to keep the slit 12 normally open. The actuator 35 comprises two projections 33 protruding from the body unit 2. The projections 33 come into contact with the shutter 31 when the carriage moves backward to the home position and further forces out the shutter 31 toward the side indicated by arrow A. The shutter 31 covers the slit 12 completely when the carriage 11 is placed in the home position as shown in FIGS. 3A and 3B.

Figure 4:
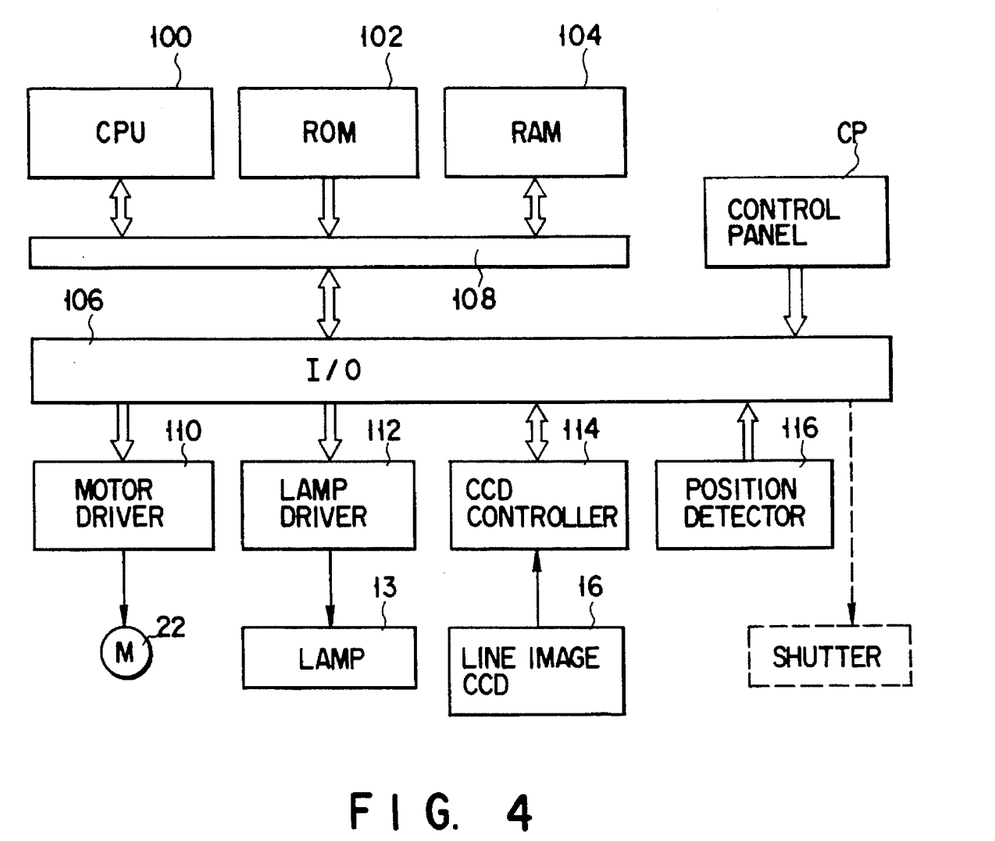
FIG. 4 is a block diagram of the control circuit of the image reading apparatus.

FIG. 4 shows the control circuit of the image reading apparatus. The control circuit comprises a CPU 100 that carries out various data processings to control the operation of the entire image reading apparatus, a ROM 102 that stores fixed data such as a control program for the CPU 100, a RAM 104 that temporarily stores variable data supplied to and from the CPU 100, an I/O interface 106 that performs data transfer between circuits explained later and the CPU 100, and a bus 108 that interconnects the CPU 100, the ROM 102, the RAM 104, and the I/O interface 106. The I/O interface 106 is connected to a control panel CP used to enter various commands such as an image reading command, a motor driver 110 that drives a motor 22, a lamp driver 112 that drives the fluorescent lamp of the light source 13, a CCD controller 114 that operates the line image CCD, and a position sensor 116 that senses the position of the carriage 11. The position detector 116 comprises, for example, a home position switch and a counter.

Next explained will be the operation of the image processing apparatus.

The CPU 100 performs an image reading process by sequentially executing the control programs stored in the ROM 102. When an image reading command is entered from the control panel CP in the image reading process, a check is made to see if the carriage 11 is in the home position. If it is not in the home position, the motor 22 is driven to move the carriage 11 backward. When the carriage 11 is placed in the home position, the actuator 35 operates the shutter mechanism 30 to close the slit 12, and then the light source 13 turns on. The CPU 100 takes in the output data from the photocells 16A of the line image CCD 16 in a state where the light reflected from the reference white plate WP and going toward the slit 12 is shut off, and stores it as the reference black data in the RAM 104. Then, the motor 22 is driven to move the carriage 11 forward. The shutter 31 moves backward as the carriage 11 moves forward. When the slit 12 is opened in this way, the reflected light from the reference white plate WP enters the slit 12 and is directed to the line image CCD 16. The CPU 100 takes in the output data produced from the photocells 16a of the line image CCD 16 in this state, and stores it as the reference white data in the RAM 104. After this, the CPU 100 determines the correction coefficients for all of the photocells 16a on the basis of the reference black data and the reference white data stored in the RAM 104, and stores them in the RAM 104. While the carriage 11 is crossing the reading window 5A of the document table 5 at a constant speed, the light from the light source is reflected by the document and directed to the line image CCD 16. The CPU 100 periodically takes in the output data from the photocells 16a of the line image CCD 16, performs shading correction by multiplying the output data of each photocell 16a by the correction coefficient stored in the RAM 104, and stores the result in the RAM 104 as a document image in units of a line. The CPU 100 sequentially supplies the lines of the document image from the RAM 104 to an external computer (not shown). After the reading of images is completed, the CPU 100 causes the carriage 11 to move backward again to the home position, and turns off the light source 13. When the continuous reading mode of document is set at the control panel CP, however, the light source 13 is kept on for subsequent document reading.

In this embodiment, the CPU 100 obtains the reference black data when the shutter mechanism 30 shuts off the light directed towards the line image CCD 116. In the continuous reading mode, the light source 1 is not tuned off. This enables image reading to be started immediately after the replacement of the document, irrespective of the rising characteristic of the light source 13. Further, because shading correction is made based on the reference black data obtained from all the photocells of the line image CCD used in actual image reading, its reliability is very high. The carriage 11 is formed as a case housing all of the light-receiving section of the optical system 10 and the shutter 31 is provided to open and close the slit 12 in the case. In this case, the surface area and the amount of movement of the shutter 31 can be made sufficiently small. This allows the light directed toward the line image CCD to be shut off without making the image reading apparatus larger. In addition, because influences due to external light are eliminated completely in obtaining the reference black data, the accuracy of shading correction is improved further.

Figure 5:
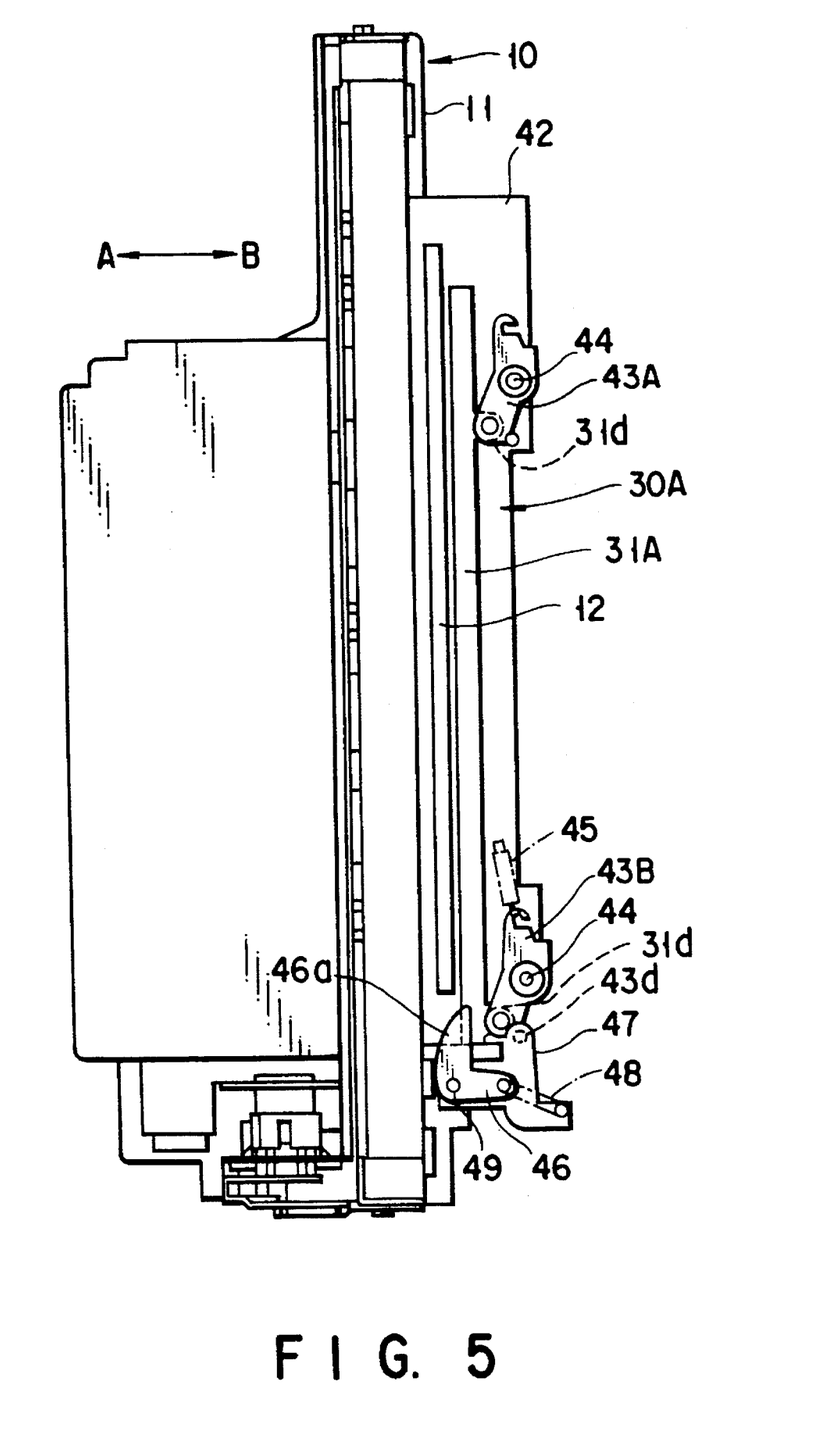
FIG. 5 is a plan view of a shading apparatus related to modifications of the embodiment of FIGS. 1A and 1B.

The light shutting device in the above embodiment can be replaced with a light shutting device shown in FIG. 5. The shutter mechanism 30A of this light shutting device contains a shutter 31A that opens and closes the slit 12, shutter arms 43A and 43B that slide the shutter 31A, and a spring 45 that pulls the shutter arm 43B so that the shutter 31 may move backward to a specified position where the slit 12 is opened. The shutter arms 43A and 43B are pivotally provided via two pivots 44 on a shutter base 42 placed on the carriage 11 so as to be adjacent to the slit 12. The shutter 31A has two connecting portions 31d, which are pivotally connected to one end of each of the shutter arms 43A and 43B, respectively. One end of the spring 45 is mounted on the shutter base 42 and its other end is connected to the other end of the shutter arm 43B. To prevent the shutter 31A from moving backward beyond the position shown in FIG. 5, the rotation of the shutter arms 43A and 43B is limited by stoppers (not shown) in the counterclockwise direction. Such a shutter mechanism 30A is combined with an L-shaped trigger arm 46, a trigger arm base 47, and an actuator having a spring 48. The trigger arm base 47 is mounted on the body unit 2. The center portion of the trigger arm 46 is pivotally mounted on the trigger arm base 47 via a pivot 49. A stud portion 43d of the shutter arm 43B is pressed against and engaged with an engaging portion 46a provided on one end of the trigger arm 46. The spring 48, which is formed so as to have larger force than the spring 45, is mounted on the trigger arm base 47 to pull the other end of the trigger arm 46.

Figure 6A:
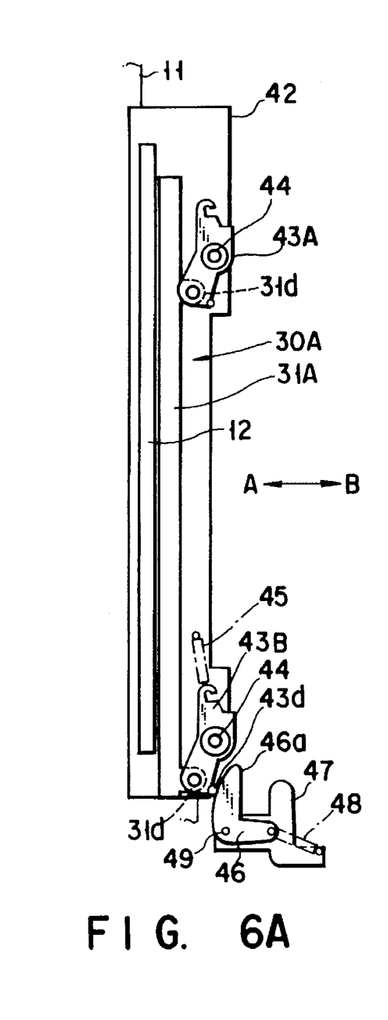
FIGS. 6A through 6D are views showing the operation of the shading apparatus of FIG. 5.
Figure 6B:
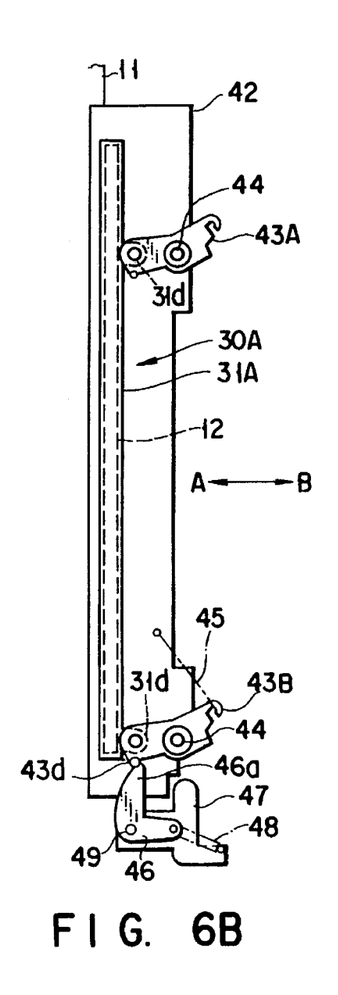
Figure 6C:
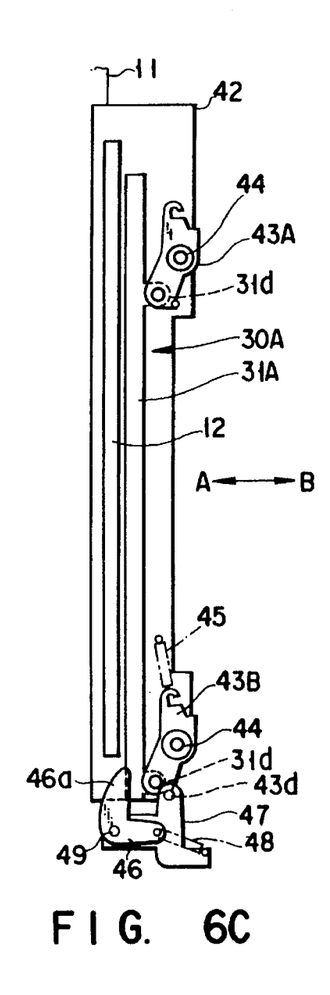
Figure 6D:
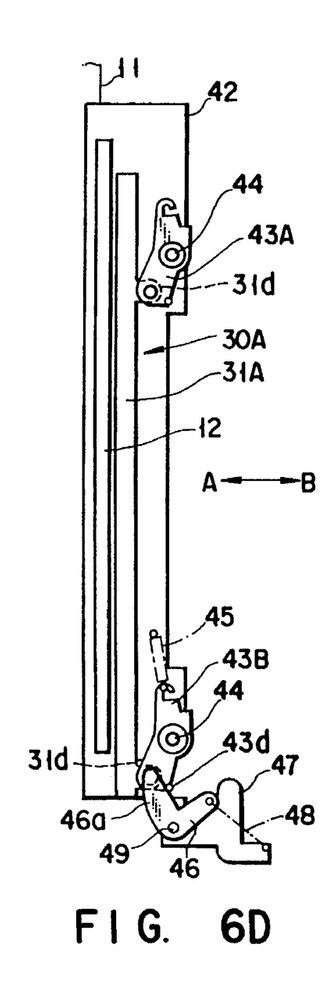

In this modification, when the carriage 11 has moved backward to the home position as shown by arrow B, the stud portion 43d of the shutter arm 43B presses against the engaging portion 46a of the trigger arm 46, which allows the shutter arm 43B to rotate clockwise, opposing the elasticity of the spring 45. This enables the shutter 31A to slide toward the side indicated by arrow A with respect to the carriage 11 to close the slit 12. When the slit 12 is covered by the shutter 31A in the way as shown in FIG. 6B, the sliding of the shutter 31A is stopped, and the output data of the photocells 16A of the line image CCD 16 are obtained as the reference black data. When the carriage 11 has further moved backward, the stud portion 43d of the shutter arm 43B is released from the engaging portion 46a of the trigger arm 46 and rotates clockwise by the elasticity of the spring 45. This allows the shutter 31A to move backward as shown by arrow B with respect to the carriage 11, which permits the slit 12 to open with the carriage 11 in the home position as shown in FIG. 6C. At this time, the output data of the photocells 16A of the line image CCD 16 are obtained as the reference white data. After the reference white data have been obtained, the carriage 11 moves forward as shown by arrow A and goes toward the reading window 5A, while causing the shutter arm 43B to rotate the trigger arm 46 counterclockwise as shown in FIG. 6D.

The modification using the shutter mechanism 30A has a similar effect to that of the first embodiment.

Furthermore, as shown by broken lines in FIG. 4, the image reading apparatus may have a light shutting device that closes the slit 12 in response to an electric trigger signal. In this case, the CPU 100 supplies the trigger signal to the light shutting device when the position detector 116 senses that the carriage 11 is in the home position.

In addition, the present invention may be applied to another type of image reading apparatus that reads an image from a document passing over the reading window. In this case, the carriage is moved from the home position below the reference white plate to a position below the reading window and then is stopped. After this, for example, an automatic document feeder feeds a document so as to pass over the reading window at a constant speed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image reading apparatus comprising:

light source means for illuminating a document;

image sensing means for performing photoelectric conversion on the light from the document and for producing output data;

light shutting means for selectively shutting off the light directed toward the image sensing means while the light source means continues to produce illumination light; and processing means for obtaining, as reference black data, the output data of said image sensing means produced in a state where the light directed toward said image sensing means is shut off by said light shutting means to thereby produce a dark state without using a separate black member; for obtaining, as image data of the document, the output data of the image sensing means produced in a state where the light directed toward said image sensing means is not shut off by said light shutting means; and for performing shading correction on the image data according to the reference black data which is obtained when the light is shut off by said light shutting means.

2. An image reading apparatus according to claim 1, wherein:

said image sensing means comprises a line image sensor having photocells arranged in a first direction; and said light source means comprises a straight light source arranged in parallel with a line extending in the first direction.

3. An image reading apparatus according to claim 2, further comprising:

a document table having a reading window that exposes a document to light from said light source means;

carriage means for supporting said line image sensor and said light source means beneath the document table; and driving means for moving the carriage means in a second direction perpendicular to the first direction.

4. An image reading apparatus according to claim 3, wherein:

said carriage means comprises a case for shielding said line image sensor from the light source means, said case having a slit for allowing the light directed toward the line image sensor to pass therethrough; and said light shutting means comprises a shutter mechanism for selectively closing said slit, and an actuator for actuating said shutter mechanism when said carriage means is located at a specified position.

5. An image reading apparatus according to claim 4, wherein said actuator includes a projection which is pressed against said shutter mechanism as the carriage means moves to said specified position.

6. An image reading apparatus according to claim 3, further comprising:

a reference white plate provided on a back portion of the document table near said reading window; and said processing means includes means for obtaining, as reference white data, the output data of said image sensor means produced when light reflected from said reference white plate hits said line image sensor.

7. An image reading method comprising the steps of:

shutting off a light from a light source which is directed toward an image sensing means for performing photoelectric conversion by enabling a light shutting means while maintaining said light source in an on condition for producing light, to produce a dark state in the vicinity of said image sensing means without using a separate black member and to thereby obtain output data of said image sensing means in said dark state as reference black data;

exposing said image sensing means to light reflected from a reference white plate and a document by disabling the light shutting means, to obtain the output data of said image sensing means as reference white data and image data of the document, respectively; and performing shading correction on the image data according to the obtained reference black data and the reference white data.

8. The image reading method of claim 7, wherein the step of shutting off the light from the light source comprises blocking the light from the light source directed to the image sensing means while maintaining said light source in an on condition for producing light.

9. The image reading method of claim 8, wherein the step of blocking the light from the light source directed to the image sensing means comprises moving a shutter mechanism into a path of the light from the light source to block the light from the light source.

10. The image reading method of claim 7, wherein said light source is mounted on a carriage which is movable, and further comprising blocking said light from the light source directed to the image sensing means when the carriage moves to a specified position.

* * * * *

UNITED STATES PATENT AND TRADEMARK OFFICE
CERTIFICATE OF CORRECTION

PATENT NO. : 5,453,850
DATED : September 26, 1995
INVENTOR(S) : AKUZAWA et al

It is certified that error appears in the above-indentified patent and that said Letters Patent is hereby corrected as shown below:

In the Title Page, under item [73] Assignee:

Change "TOKYO ELECTRIC CO., LTD." to

--KABUSHIKI KAISHA TEC--

Signed and Sealed this

Sixteenth Day of January, 1996

*Attest:*

BRUCE LEHMAN

*Attesting Officer*  *Commissioner of Patents and Trademarks*